(12) United States Patent
Henkel et al.

(10) Patent No.: US 11,214,309 B2
(45) Date of Patent: Jan. 4, 2022

(54) ALIGNMENT TOOL FOR STEERING KNUCKLE IN A WORK VEHICLE

(71) Applicant: CNH Industrial America LLC, New Holland, PA (US)

(72) Inventors: Edmund R. Henkel, Naperville, IL (US); Michael R. Jensen, Lockport, IL (US); Scott Spencer, Franksville, WI (US)

(73) Assignee: CNH Industrial America LLC, New Holland, PA (US)

( * ) Notice: Subject to any disclaimer, the term of this patent is extended or adjusted under 35 U.S.C. 154(b) by 194 days.

(21) Appl. No.: 16/713,404

(22) Filed: Dec. 13, 2019

(65) Prior Publication Data

US 2021/0179175 A1 Jun. 17, 2021

(51) Int. Cl.
*B62D 17/00* (2006.01)
*B62D 15/02* (2006.01)
*B62D 7/18* (2006.01)

(52) U.S. Cl.
CPC .......... *B62D 17/00* (2013.01); *B62D 7/18* (2013.01); *B62D 15/021* (2013.01)

(58) Field of Classification Search
CPC ......... B62D 17/00; B62D 7/18; B62D 15/021
USPC ............................ 280/86.75, 86.755, 93.512
See application file for complete search history.

(56) References Cited

U.S. PATENT DOCUMENTS

| | | | | |
|---|---|---|---|---|
| 4,029,337 | A * | 6/1977 | Bishop | B62D 17/00 280/93.5 |
| 4,970,801 | A * | 11/1990 | Specktor | B62D 17/00 280/86.755 |
| 5,781,286 | A * | 7/1998 | Knestel | G01B 11/2755 33/203.18 |
| 6,293,724 | B1 * | 9/2001 | Spears | B60G 7/005 280/86.751 |
| 6,402,168 | B1 * | 6/2002 | Chino | B62D 17/00 280/86.758 |
| 9,085,068 | B2 * | 7/2015 | Schley | B25B 27/0035 |
| 9,598,104 | B1 * | 3/2017 | Lam | B62D 7/18 |
| 10,583,546 | B2 * | 3/2020 | Yang | B25B 27/023 |

(Continued)

FOREIGN PATENT DOCUMENTS

| CN | 201795765 U | 4/2011 |
|---|---|---|
| CN | 104385186 A | 3/2015 |

(Continued)

*Primary Examiner* — Toan C To
(74) *Attorney, Agent, or Firm* — Rickard K. De Mille; Rebecca L. Henkel

(57) ABSTRACT

An alignment tool for a work vehicle includes: an axle housing connecting portion having a housing mating feature configured to mount to a respective mating feature of an axle housing; and a steering knuckle connecting portion coupled with the axle housing connecting portion and having a knuckle mating feature configured to mount to a respective mating feature of a steering knuckle, the steering knuckle connecting portion being coupled to the axle housing connecting portion and angled with respect to the axle housing connecting portion such that the housing mating feature is mountable to the mating feature of the axle housing and the knuckle mating feature is mountable to the mating feature of the steering knuckle only when the steering knuckle is at a fully steered position.

20 Claims, 4 Drawing Sheets

(56) References Cited

U.S. PATENT DOCUMENTS

2001/0020323 A1* 9/2001 Klann ................ B25B 27/0035
29/256
2019/0071124 A1* 3/2019 Carter ................ B62D 15/023

FOREIGN PATENT DOCUMENTS

CN       204871284 U    12/2015
WO     2000/34058 A1   6/2000

* cited by examiner

ALIGNMENT TOOL FOR STEERING KNUCKLE IN A WORK VEHICLE

BACKGROUND OF THE INVENTION

The present invention pertains to work vehicles and, more specifically, to agricultural work vehicles.

Work vehicles, such as agricultural work vehicles, are often used to perform a variety of functions, such as towing. Many work vehicles include two or more pairs of wheels with at least one steerable axle assembly. Many steerable axle assemblies include a steering sensor that outputs steering signals corresponding to a steering angle of the axle. The output steering signals may be received by a controller, which may control steering of the vehicle to prevent, for example, steering maneuvers that are unsafe. To safely control steering of the vehicle, the output steering signals must be accurately calibrated to the steering angle of the axle.

What is needed in the art is a way to accurately calibrate a steering sensor of a work vehicle.

SUMMARY OF THE INVENTION

Exemplary embodiments disclosed herein provide an alignment tool with two portions that only mount to an axle housing and a steering knuckle of an axle assembly when the steering knuckle is at a fully steered position.

In some exemplary embodiments provided according to the present disclosure, an alignment tool for a work vehicle includes: an axle housing connecting portion having a housing mating feature configured to mount to a respective mating feature of an axle housing; and a steering knuckle connecting portion coupled with the axle housing connecting portion and having a knuckle mating feature configured to mount to a respective mating feature of a steering knuckle, the steering knuckle connecting portion being angled with respect to the axle housing connecting portion such that the housing mating feature is mountable to the mating feature of the axle housing and the knuckle mating feature is mountable to the mating feature of the steering knuckle only when the steering knuckle is at a fully steered position.

In some exemplary embodiments provided according to the present disclosure, an axle assembly for a work vehicle includes: an axle housing including a mating feature; a steering knuckle pivotably coupled to the axle housing and including a mating feature, the steering knuckle being pivotable, relative to the axle housing, between a zero steered position and a fully steered position; a wheel hub assembly coupled to the steering knuckle; and an alignment tool coupled to the axle housing and the steering knuckle. The alignment tool includes: an axle housing connecting portion having a housing mating feature mounted to the mating feature of the axle housing; and a steering knuckle connecting portion coupled with the axle housing connecting portion and having a knuckle mating feature mounted to the mating feature of the steering knuckle, the steering knuckle connecting portion being angled with respect to the axle housing connecting portion such that the housing mating feature mounts to the mating feature of the axle housing and the knuckle mating feature mounts to the mating feature of the steering knuckle only when the steering knuckle is at the fully steered position.

In some exemplary embodiments, a method of adjusting an axle assembly for a work vehicle is provided according to the present disclosure. The method includes: pivoting a steering knuckle, relative to a pivotably coupled axle housing, to a fully steered position; and coupling an alignment tool to the steering knuckle and the axle housing to maintain the steering knuckle in the fully steered position. The alignment tool includes: an axle housing connecting portion having a housing mating feature mounted to a mating feature of the axle housing; and a steering knuckle connecting portion having a knuckle mating feature mounted to a mating feature of the steering knuckle, the steering knuckle connecting portion being coupled with the axle housing connecting portion and being angled with respect to the axle housing connecting portion such that the housing mating feature mounts to the mating feature of the axle housing and the knuckle mating feature mounts to the mating feature of the steering knuckle only when the steering knuckle is at the fully steered position.

One possible advantage that may be realized by exemplary embodiments provided according to the present disclosure is that the alignment tool makes it easy to know when the steering knuckle is at the fully steered position, which can increase assembly and service speed of the axle assembly.

Another possible advantage that may be realized by exemplary embodiments provided according to the present disclosure is that the alignment tool can improve the accuracy of calibrating the steering angle of the work vehicle.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "fore", "aft", "left" and "right", when used in connection with a vehicle assembly and/or components thereof are usually determined with reference to the direction of forward operative travel of the vehicle assembly, but they should not be construed as limiting. The terms "longitudinal" and "transverse" are determined with reference to the fore-and-aft direction of the vehicle assembly and are equally not to be construed as limiting.

Figure 1:
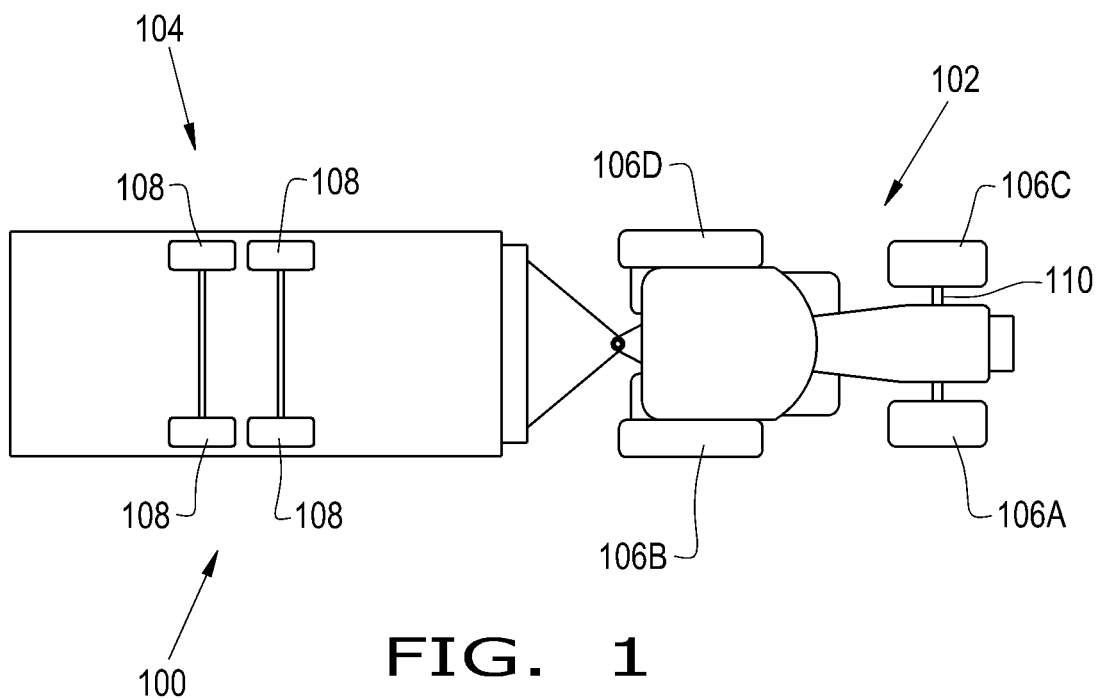
FIG. 1 illustrates a top view of a work vehicle assembly including a work vehicle towing a trailer, in accordance with an exemplary embodiment of the present invention.

Referring now to the drawings, and more particularly to FIG. 1, there is shown an exemplary embodiment of a work vehicle assembly 100 provided according to the present invention. The work vehicle assembly 100 includes a work vehicle 102, illustrated in the embodiment of a tractor, and a trailer 104 being carried by the work vehicle 102. In one embodiment, the work vehicle 102 and the trailer 104 are mechanically coupled together, for example with a towing joint, or other well-known coupling assemblies. The work vehicle 102 includes wheels 106A, 106B, 106C, and 106D and the trailer 104 includes trailer wheels 108. The front wheels 106A, 106C of the work vehicle 102 may be steerable wheels that are steered by an axle assembly 110. It should be appreciated that while the work vehicle 102 is illustrated as an agricultural tractor, the work vehicle 102 can be other types of work vehicles.

Figure 2:
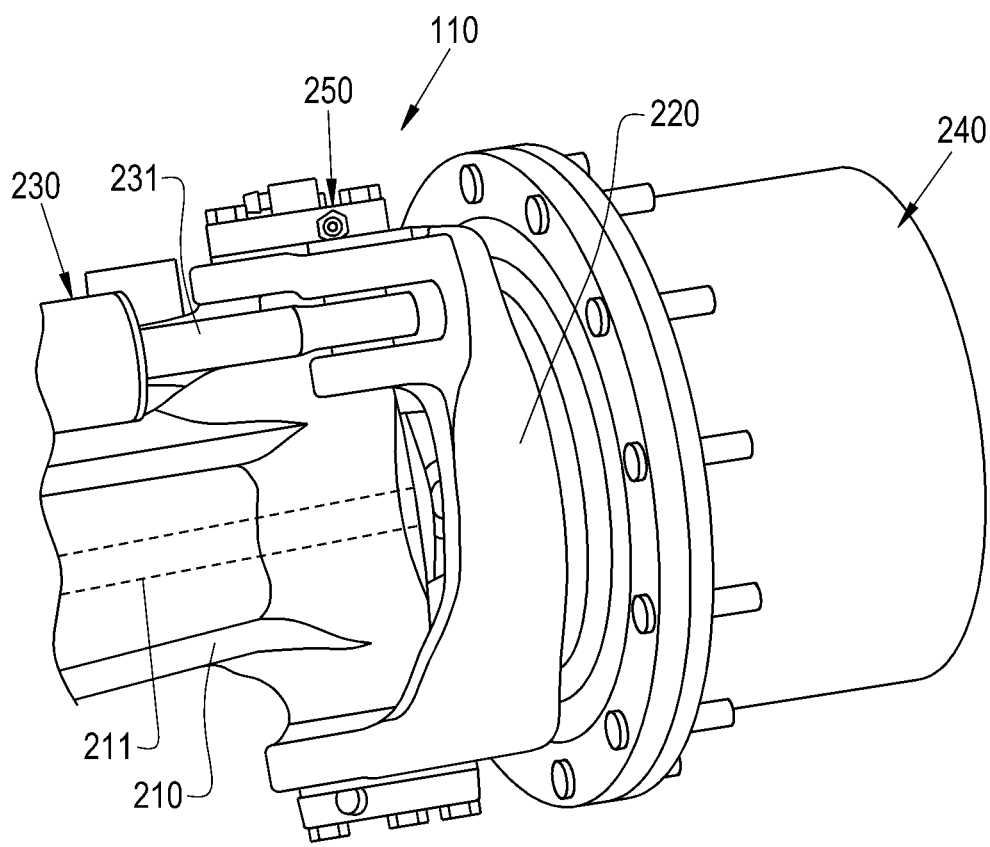
FIG. 2 illustrates a perspective view of an axle assembly including an axle housing and a steering knuckle at a zero steered position, in accordance with an exemplary embodiment of the present invention.
Figure 3:
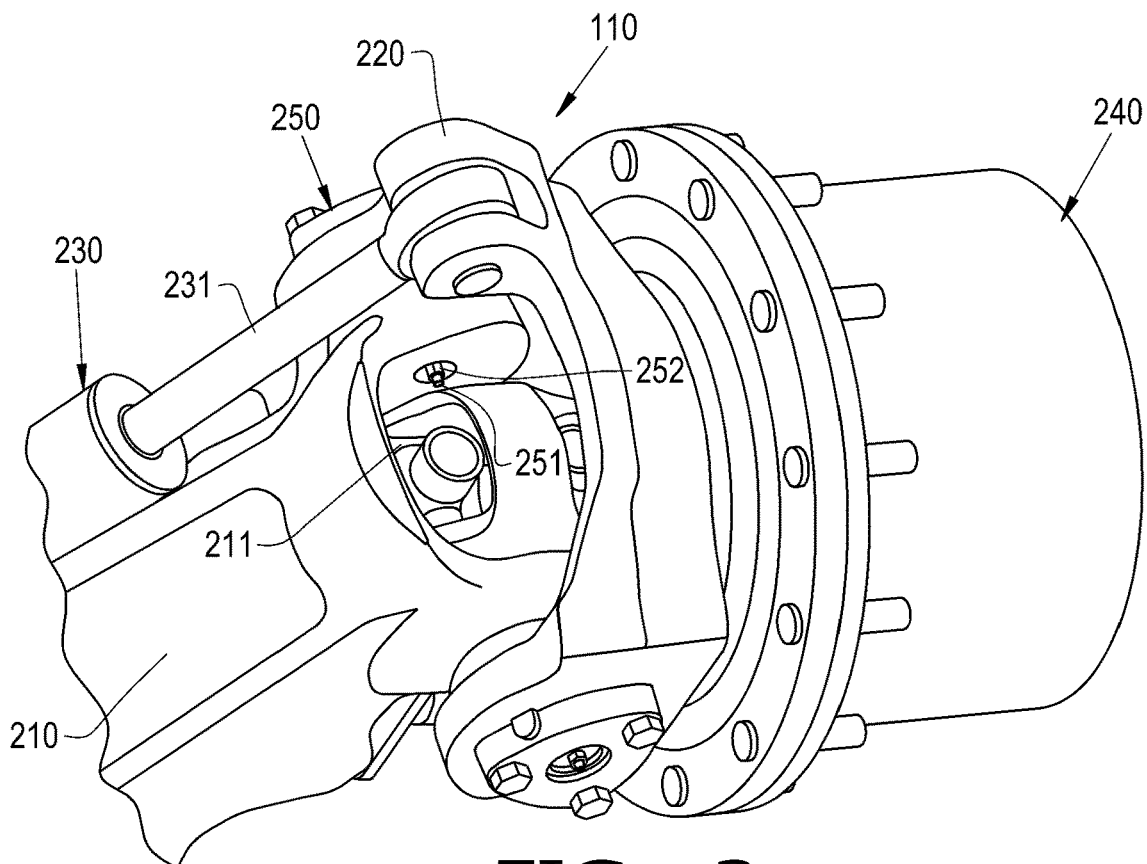
FIG. 3 illustrates the axle assembly of FIG. 2 with the steering knuckle at a fully steered position.

Referring now to FIGS. 2 and 3, the axle assembly 110 is illustrated in greater detail. The axle assembly 110 generally includes an axle housing 210 that houses an axle 211. In some embodiments, the axle 211 is uncoupled from a transmission of the work vehicle 102. The axle 211 may alternatively be coupled to the transmission in, for example, an all-wheel drive system. A steering knuckle 220 is pivotably coupled to the axle housing 210 and pivotable relative to the axle housing 210. The steering knuckle 220 is pivotable between a zero steered position, illustrated in FIG. 2, and a fully steered position, illustrated in FIG. 3. The zero steered position may correspond to a steering angle of 0° while the fully steered position may be considerably higher, such as between 50° and 60°. The steering knuckle 220 may be pivoted, for example, by activating a knuckle cylinder 230 that is coupled to the steering knuckle 220. Activating the knuckle cylinder 230 can cause extension or retraction of a cylinder rod 231 coupled to the steering knuckle 220, resulting in pivoting of the steering knuckle 220 relative to the axle housing 210. The steering knuckle 220 may be coupled to a hub assembly 240 to which the wheels 106A, 106C connect. Thus, the wheels 106A, 106C can be steered by extending and retracting the cylinder rod 231 of the knuckle cylinder 230 to pivot the steering knuckle 220 and the coupled hub assembly 240.

Figure 4:
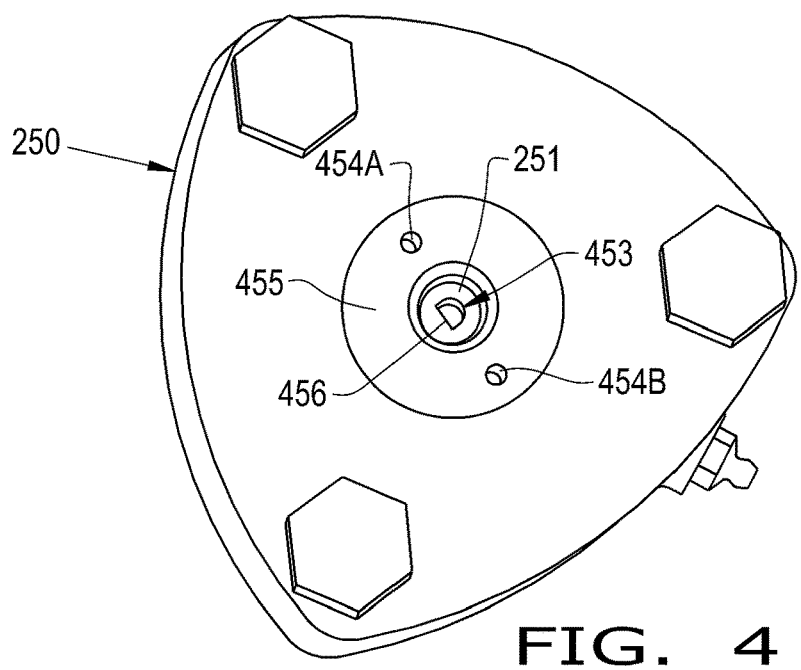
FIG. 4 illustrates a top view of a steering sensor of the axle assembly of FIGS. 2-3.

With further reference to FIGS. 2-3, and referring now to FIG. 4 as well, it is illustrated that the axle assembly 110 may include a steering angle sensor 250 that is associated with the steering knuckle 220 and configured to output a steering angle signal corresponding to the steering angle of the steering knuckle 220. The steering angle sensor 250 may include a sensor shaft 251 and a shaft jam nut 252 that is mounted to the sensor shaft 251. As can be appreciated from comparing FIGS. 2 and 3, the shaft jam nut 252 may be covered when the steering knuckle 220 is at the zero steered position and exposed when the steering knuckle 220 is at the fully steered position. The sensor shaft 251 includes a slot 453 (illustrated in FIG. 4), which may have a D-shape, that indicates the current angular position of the sensor shaft 251. A pair of alignment openings 454A, 454B may be disposed on a surface 455 of the steering angle sensor 250 and may be used to indicate the proper orientation of the D-shaped slot 453. For example, the correct orientation of the sensor shaft 251 when the steering knuckle 220 is at the zero steered position may be when a straight edge 456 of the D-shaped slot 453 is aligned with the alignment openings 454A, 454B. When the sensor shaft 251 is in such an orientation, the steering angle sensor 250 outputs the steering angle signal that corresponds to the zero steered position, which may be received by a controller and used to determine the steering angle.

Calibrating the steering angle sensor 250 requires adjustment of, for example, the angular position of the sensor shaft 251. The shaft jam nut 252, when tightened, maintains the angular position of the sensor shaft 251 to prevent inadvertent adjustment of the sensor shaft 251 during operation. Thus, to adjust the sensor shaft 251, the shaft jam nut 252 must be loosened. Because the shaft jam nut 252 may be covered when the steering knuckle 220 is at the zero steered position, many calibration methods use the fully steered position of the steering knuckle 220 as a reference. When the steering knuckle 220 is at the fully steered position, the shaft jam nut 252 is exposed and may be loosened to allow rotation of the sensor shaft 251 to adjust the steering angle output of the steering angle sensor 250 and calibrate the steering angle sensor 250. Known ways of moving the steering knuckle 220 to the fully steered position during calibration include the use of a stop, but such ways are not always accurate or precise because of how the parts are machined. Thus, known ways of calibrating the steering angle sensor 210 are prone to introducing error in the determination of the steering angle.

Figure 5:
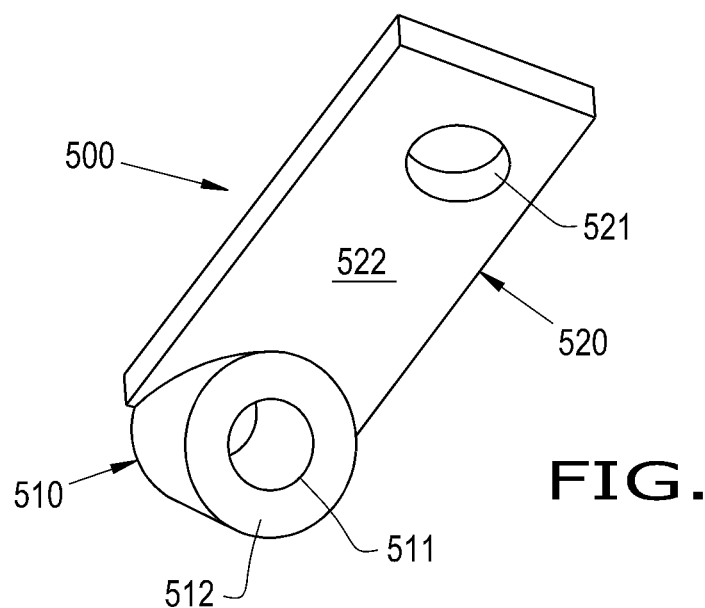
FIG. 5 illustrates a perspective view of an alignment tool for the work vehicle of FIG. 1, in accordance with an exemplary embodiment of the present invention.
Figure 6:
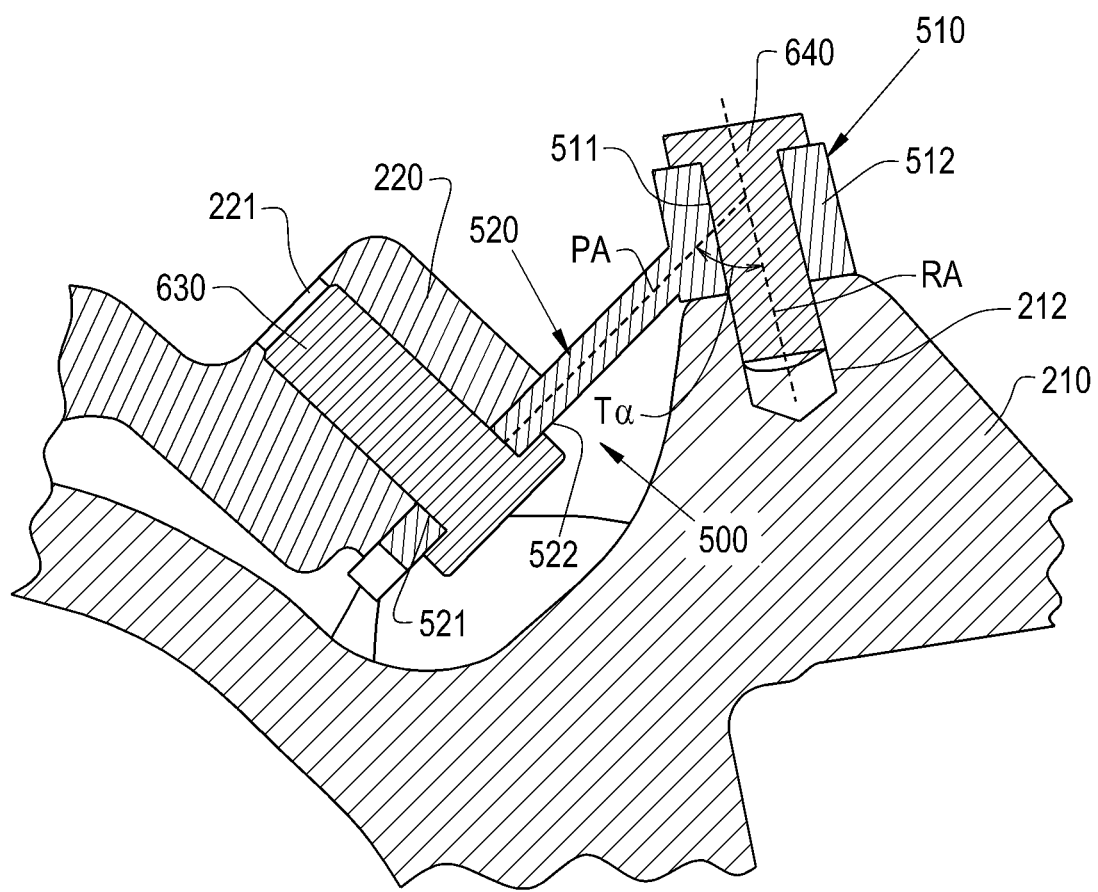
FIG. 6 illustrates a cross-sectional view of the alignment tool of FIG. 5 coupled to the axle housing and the steering knuckle of the axle assembly of FIGS. 2-4 when the steering knuckle is in the fully steered position.
Figure 7:
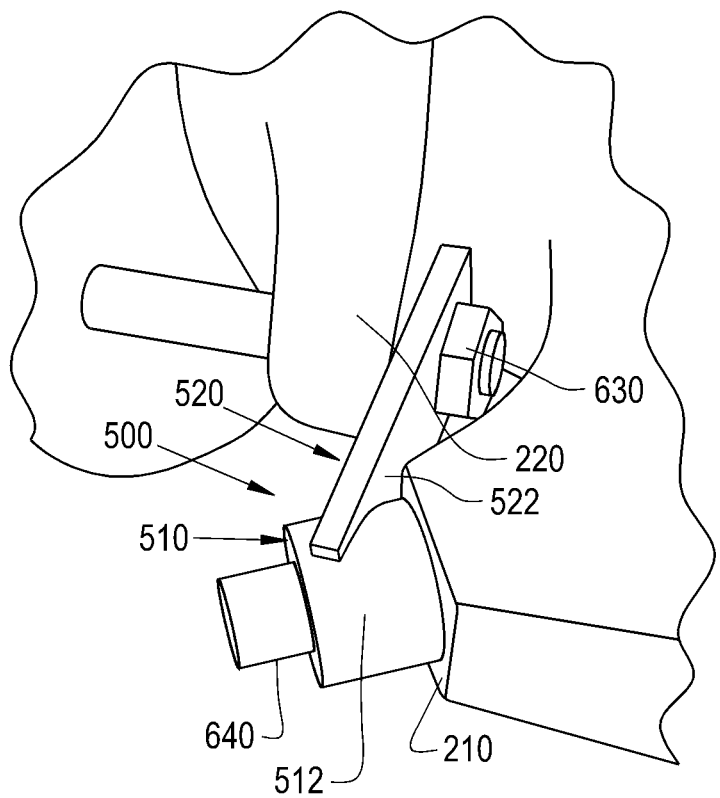
FIG. 7 illustrates a perspective view of the alignment tool of FIG. 5 coupled to the axle housing and the steering knuckle of the axle assembly of FIGS. 2-4 when the steering knuckle is in the fully steered position.

To address some of the previously described issues, and referring now to FIGS. 5-7, an exemplary embodiment of an alignment tool 500 provided according to the present disclosure is illustrated. The alignment tool 500 includes an axle housing connecting portion 510 and a steering knuckle connecting portion 520 coupled to the axle housing connecting portion 510. The axle housing connection portion 510 includes a housing mating feature 511 that is configured to mount to a respective mating feature 212 of the axle housing 210, as illustrated in FIGS. 6 and 7. Similarly, the steering knuckle connecting portion 520 includes a knuckle mating feature 521 that is configured to mount to a respective mating feature 221 of the steering knuckle 220, as illustrated in FIGS. 6 and 7.

The steering knuckle connecting portion 520 is angled with respect to the axle housing connecting portion 510 such that the housing mating feature 511 is mountable to the mating feature 212 of the axle housing 210 and the knuckle mating feature 521 is mountable to the mating feature 221 of the steering knuckle 220 only when the steering knuckle 220 is at the fully steered position. In other words, the connecting portions 510, 520 of the alignment tool 500 are incapable of mounting to the axle housing 210 and the steering knuckle 220, respectively, unless the steering knuckle 220 is in the fully steered position. By having such an angling, a user can ensure that the steering knuckle 220 is in the fully steered position by mounting the housing mating feature 511 to the mating feature 212 of the axle housing 210 and also mounting the knuckle mating feature 521 to the mating feature 221 of the steering knuckle 220. Further, when the mating features 511, 521 of the alignment tool 500 are mounted to their respective mating features 212, 221, the alignment tool 500 can hold the steering knuckle 220 in the fully steered position. In this respect, the alignment tool 500 may be sufficiently rigid to maintain the steering knuckle 220 at the fully steered position when the mating features 511, 521 of the alignment tool 500 are mounted to their respective mating features 212, 221, i.e., the alignment tool 500 can bear the load from holding the steering knuckle 220 at the fully steered position without failing. Thus, a user can use the alignment tool 500 to easily put and keep the steering knuckle 220 in the fully steered position to access the shaft jam nut 252 and calibrate the steering angle sensor 250.

In some embodiments, the steering knuckle connecting portion 520 comprises a planar surface 522 with the knuckle mating feature 521 formed therein. The planar surface 522 may be, for example, part of a block comprising a metal, such as steel, iron, or aluminum. The knuckle mating feature 521 may comprise an opening. It should be appreciated that while the knuckle mating feature 521 is illustrated as comprising an opening, the knuckle mating feature 521 may be formed as other types of mating features, including but not limited to protrusions, slots, etc. When the knuckle mating feature 521 comprises an opening, the knuckle mating feature 521 may mount to the mating feature 221 of the steering knuckle 220 using a fastener 630, such as a bolt. It should be appreciated, however, that the knuckle mating feature 521 may be configured to mount to the mating feature 221 of the steering knuckle 220 without using a separate fastener.

In some embodiments, the axle housing connecting portion 510 comprises an annular ring 512 with the housing mating feature 511 formed therein. The annular ring 512 may be formed of a rigid metal, such as steel, iron, aluminum. The housing mating feature 511 may comprise an opening, similar to the knuckle mating feature 521. It should be appreciated that while the housing mating feature 511 is illustrated as comprising an opening, the housing mating feature 511 may be formed as other types of mating features, including but not limited to protrusions, slots, etc. When the housing mating feature 511 comprises an opening, the housing mating feature 511 may mount to the mating feature 212 of the axle housing 210 using a fastener 640, such as a bolt. It should be appreciated, however, that the housing mating feature 511 may be configured to mount to the mating feature 212 of the axle housing 210 without using a separate fastener.

The annular ring 512 may be defined about a ring axis RA that defines a tool angle Ta with respect to a plane axis PA of the planar surface 522. The tool angle Ta may define the angling of the portions 510, 520 of the alignment tool 500 relative to each other. The tool angle Ta may be varied to get the proper mounting alignment of the mating features 511, 521 of the portions 510, 520 with their respective mating features 212, 221 of the axle housing 210 and the steering knuckle 220.

From the foregoing, it should be appreciated that the alignment tool 500 may be used to quickly and accurately verify that the steering knuckle 220 is at the fully steered position. Because the mating features 511, 521 of the alignment tool 500 can only mount to the mating features 212, 221 of the axle housing 210 and the steering knuckle 220, respectively, when the steering knuckle 220 is at the fully steered position, any positioning of the steering knuckle 220 besides at the fully steered position prevents mounting of the alignment tool 500. This mounting can ensure accurate and quick positioning of the steering knuckle 220 that does not require a user to do any additional measurements to ensure the steering knuckle 220 is at the fully steered position.

Figure 8:
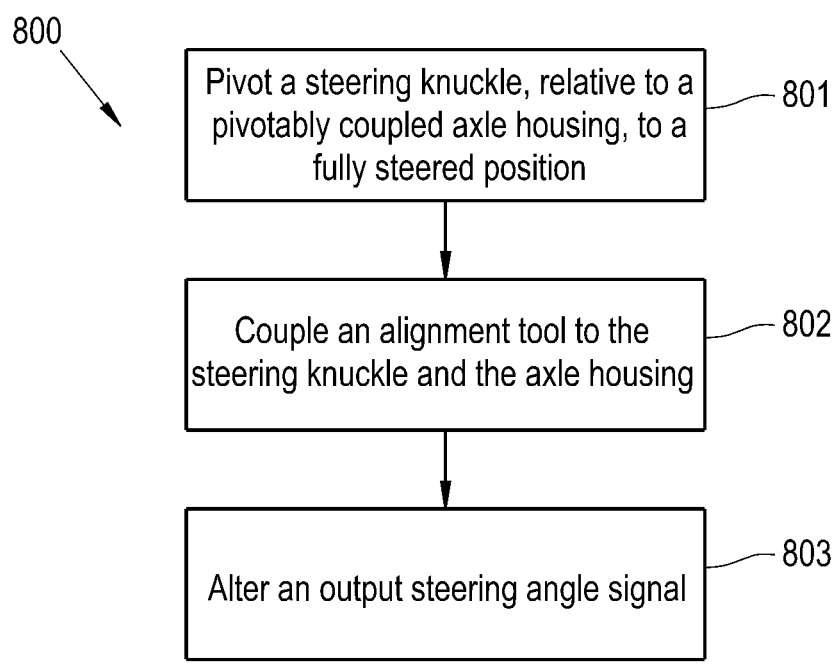
FIG. 8 illustrates a flow chart of a method of adjusting an axle assembly for a work vehicle, provided in accordance with the present disclosure.

Referring now to FIG. 8, an exemplary embodiment of a method 800 of adjusting the axle assembly 110 for the work vehicle 102 provided according to the present disclosure is illustrated. The method includes pivoting 801 the steering knuckle 220, relative to the pivotably coupled axle housing 210, to the fully steered position and coupling 802 the previously described alignment tool 500 to the steering knuckle 220 and the axle housing 210 to maintain the steering knuckle 220 in the fully steered position. Coupling 802 the alignment tool 500 to the steering knuckle 220 and the axle housing 210 may include, for example, inserting a pair of fasteners 630, 640 into respective mating features 212, 221, 511, 521 of the axle housing 210, the steering knuckle 220, and the alignment tool 500. When the alignment tool 500 is coupled 802 to the steering knuckle 220 and the axle housing 210, the shaft jam nut 252 may be exposed and loosened. The method 800 may further including altering 803 the output steering angle signal by rotating the sensor shaft 251 of the steering angle sensor 250, which may require loosening the shaft jam nut 252 when the shaft jam nut 252 is exposed.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. An alignment tool for a work vehicle, the alignment tool comprising:
an axle housing connecting portion comprising a housing mating feature configured to mount to a respective mating feature of an axle housing; and
a steering knuckle connecting portion coupled with the axle housing connecting portion and comprising a knuckle mating feature configured to mount to a respective mating feature of a steering knuckle, the steering knuckle connecting portion being angled with respect to the axle housing connecting portion such that the housing mating feature is mountable to the mating feature of the axle housing and the knuckle mating feature is mountable to the mating feature of the steering knuckle only when the steering knuckle is at a fully steered position.

2. The alignment tool of claim 1, wherein the steering knuckle connecting portion comprises a planar surface with the knuckle mating feature formed therein.

3. The alignment tool of claim 2, wherein the knuckle mating feature comprises an opening.

4. The alignment tool of claim 1, wherein the axle housing connecting portion comprises an annular ring with the housing mating feature formed therein.

5. The alignment tool of claim 4, wherein the housing mating feature comprises an opening.

6. The alignment tool of claim 5, wherein the steering knuckle connecting portion comprises a planar surface with the knuckle mating feature formed therein.

7. The alignment tool of claim 6, wherein the knuckle mating feature comprises an opening.

8. The alignment tool of claim 1, wherein the alignment tool is sufficiently rigid to maintain the steering knuckle at the fully steered position when the housing mating feature is mounted to the mating feature of the axle housing and the knuckle mating feature is mounted to the mating feature of the steering knuckle.

9. An axle assembly for a work vehicle, comprising:
an axle housing comprising a mating feature;
a steering knuckle pivotably coupled to the axle housing and comprising a mating feature, the steering knuckle being pivotable, relative to the axle housing, between a zero steered position and a fully steered position;

a wheel hub assembly coupled to the steering knuckle; and an alignment tool coupled to the axle housing and the steering knuckle, the alignment tool comprising:
   an axle housing connecting portion comprising a housing mating feature mounted to the mating feature of the axle housing; and
   a steering knuckle connecting portion coupled with the axle housing connecting portion and comprising a knuckle mating feature mounted to the mating feature of the steering knuckle, the steering knuckle connecting portion being angled with respect to the axle housing connecting portion such that the housing mating feature mounts to the mating feature of the axle housing and the knuckle mating feature mounts to the mating feature of the steering knuckle only when the steering knuckle is at the fully steered position.

10. The axle assembly of claim 9, wherein the steering knuckle connecting portion comprises a planar surface with the knuckle mating feature formed therein.

11. The axle assembly of claim 10, wherein the knuckle mating feature comprises an opening.

12. The axle assembly of claim 9, wherein the axle housing connecting portion comprises an annular ring with the housing mating feature formed therein.

13. The axle assembly of claim 12, wherein the housing mating feature comprises an opening.

14. The axle assembly of claim 13, wherein the steering knuckle connecting portion comprises a planar surface with the knuckle mating feature formed therein.

15. The axle assembly of claim 14, wherein the knuckle mating feature comprises an opening.

16. The axle assembly of claim 9, wherein the alignment tool is sufficiently rigid to maintain the steering knuckle at the fully steered position when the housing mating feature is mounted to the mating feature of the axle housing and the knuckle mating feature is mounted to the mating feature of the steering knuckle.

17. The axle assembly of claim 9, further comprising a steering angle sensor associated with the steering knuckle and configured to output a steering angle signal corresponding to a steering angle of the steering knuckle.

18. The axle assembly of claim 17, wherein the steering angle sensor comprises a sensor shaft and a shaft jam nut that is mounted to the sensor shaft, covered when the steering knuckle is in the zero steered position, and exposed when the steering knuckle is in the fully steered position.

19. A method of adjusting an axle assembly for a work vehicle, the method comprising:
   pivoting a steering knuckle, relative to a pivotably coupled axle housing, to a fully steered position; and
   coupling an alignment tool to the steering knuckle and the axle housing to maintain the steering knuckle in the fully steered position, the alignment tool comprising:
      an axle housing connecting portion comprising a housing mating feature mounted to a mating feature of the axle housing; and
      a steering knuckle connecting portion coupled with the axle housing connecting portion and comprising a knuckle mating feature mounted to a mating feature of the steering knuckle, the steering knuckle connecting portion being coupled with the axle housing connecting portion and being angled with respect to the axle housing connecting portion such that the housing mating feature mounts to the mating feature of the axle housing and the knuckle mating feature mounts to the mating feature of the steering knuckle only when the steering knuckle is at the fully steered position.

20. The method of claim 19, wherein the axle assembly comprises a steering angle sensor associated with the steering knuckle and configured to output a steering angle signal corresponding to a steering angle of the steering knuckle, the steering angle sensor comprising a sensor shaft and a shaft jam nut that is mounted to the sensor shaft, covered when the steering knuckle is in the zero steered position, and exposed when the steering knuckle is in the fully steered position, the method further comprising altering the output steering angle signal by rotating the sensor shaft.

* * * * *